United States Patent
Kaibara

(10) Patent No.: US 10,531,023 B2
(45) Date of Patent: Jan. 7, 2020

(54) IMAGING APPARATUS AND DRIVING METHOD FOR THE IMAGING APPARATUS

(71) Applicant: CANON KABUSHIKI KAISHA, Tokyo (JP)

(72) Inventor: Hiroshi Kaibara, Hino (JP)

(73) Assignee: Canon Kabushiki Kaisha, Tokyo (JP)

( * ) Notice: Subject to any disclaimer, the term of this patent is extended or adjusted under 35 U.S.C. 154(b) by 48 days.

(21) Appl. No.: 15/726,266

(22) Filed: Oct. 5, 2017

(65) Prior Publication Data

US 2018/0103217 A1 Apr. 12, 2018

(30) Foreign Application Priority Data

Oct. 12, 2016 (JP) ................................ 2016-200882

(51) Int. Cl.
| | | |
|---|---|---|
| H04N 5/235 | (2006.01) | |
| G03B 7/00 | (2014.01) | |
| H04N 5/353 | (2011.01) | |
| H04N 5/374 | (2011.01) | |
| H04N 5/378 | (2011.01) | |

(52) U.S. Cl.
CPC ........... *H04N 5/3532* (2013.01); *H04N 5/374* (2013.01); *H04N 5/378* (2013.01)

(58) Field of Classification Search
CPC ...... H04N 5/3532; H04N 5/374; H04N 5/378; H04N 5/3535; H04N 5/353; H04N 5/341; H04N 5/343

See application file for complete search history.

(56) References Cited

U.S. PATENT DOCUMENTS

| | | | | |
|---|---|---|---|---|
| 7,068,315 B1* | 6/2006 | Suzuki | ................. | H04N 5/3532 250/208.1 |
| 2009/0316031 A1* | 12/2009 | Wakamori | ........... | H04N 5/3532 348/308 |
| 2010/0277631 A1* | 11/2010 | Sugiyama | .......... | H04N 5/35581 348/297 |
| 2011/0242351 A1* | 10/2011 | Shoji | ................... | H01L 27/1464 348/222.1 |
| 2014/0371535 A1* | 12/2014 | Seto | ..................... | A61B 1/0661 600/160 |

FOREIGN PATENT DOCUMENTS

JP 2000-134547 A 5/2000

* cited by examiner

*Primary Examiner* — Kelly L Jerabek
(74) *Attorney, Agent, or Firm* — Canon U.S.A., Inc. I.P. Division

(57) ABSTRACT

A first exposure time is determined on a basis of an image generated by an imaging element, a horizontal scanning period is determined on a basis of the first exposure time, a second exposure time which is an integer multiple of the horizontal scanning period is determined, and an image is generated by an electronic shutter of the second exposure time of the imaging element. Thus, high speed electronic shutter image capturing with a suitable exposure time can be performed.

12 Claims, 7 Drawing Sheets

With influence of magnetic noise

Actual exposure time = 3H,
No gain correction

With influence of magnetic noise and
without influence of rolling distortion

Actual exposure time = 2H,
No gain correction

With influence of magnetic
noise and rolling distortion

Actual exposure time =
2H (ΔTv0.125 step), Gain corrected

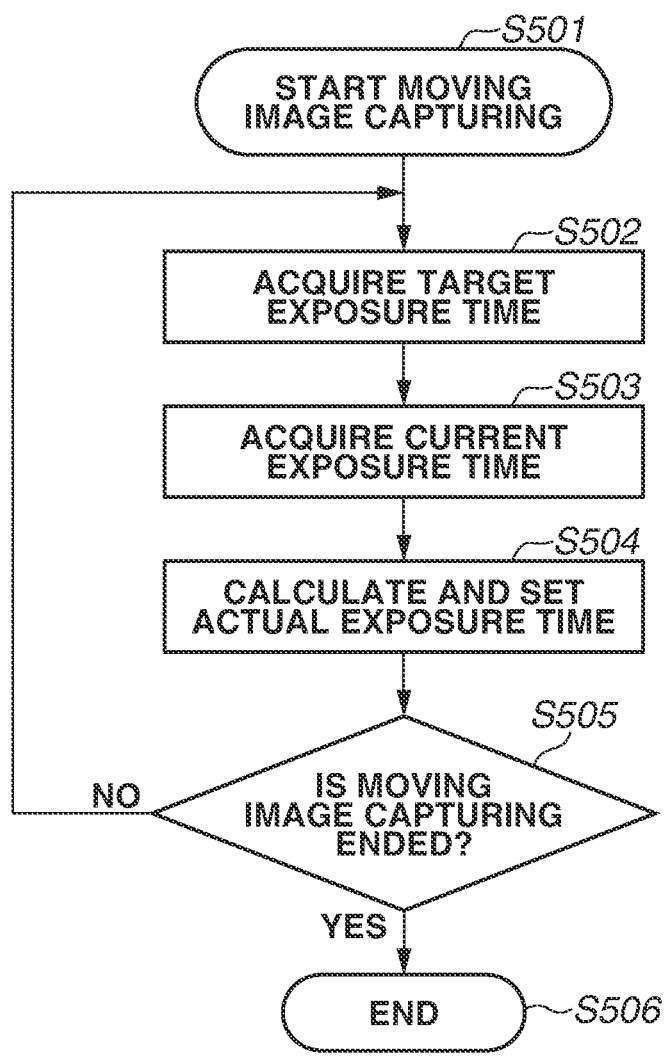

IMAGING APPARATUS AND DRIVING METHOD FOR THE IMAGING APPARATUS

BACKGROUND OF THE INVENTION

Field of the Invention

The present disclosure relates to one or more embodiments of an imaging apparatus and a driving method for the imaging apparatus.

Description of the Related Art

In recent years, an image sensor called a complementary metal oxide semiconductor (CMOS) sensor is often used as an imaging element of an imaging apparatus, such as digital camera. The CMOS sensor employs line by line exposure and readout system (rolling shutter) to realize low power consumption and high-speed readout. On the other hand, this system raises issues in image quality due to image distortion (rolling shutter distortion) during high-speed moving object image capturing, occurrence of bright and dark portions by using a flash, and occurrence of flicker in a plane illuminated by a fluorescent lamp. However, in recent years, a further increase in a readout speed reduces rolling shutter distortion, and still image capturing that uses a rolling shutter is becoming increasingly popular.

In general, still image capturing by using a rolling shutter but not using a mechanical shutter has advantages in low noise, no vibration, and a high shutter speed. Among these advantages, when the high shutter speed is executed, an electronic shutter should be controlled minutely. Japanese Patent Application Laid-Open No. 2000-134547 discloses a technique that adjusts control signal timing of an electronic shutter in a length of a horizontal scanning period and finely adjusts the control signal timing within a length of less than one horizontal scanning period.

However, most of CMOS sensors have a limitation that control signal timing of an electronic shutter is adjustable only in the length of the horizontal scanning period, and thus, an issue of how to realize a high speed shutter arises.

SUMMARY OF THE INVENTION

The present disclosure is directed to at least one embodiment of an imaging apparatus and a driving method for the imaging apparatus that enable high-speed electronic shutter image capturing for a suitable exposure time.

According to at least one aspect of one or more embodiments of the present disclosure, an imaging apparatus includes an imaging element that generates an image through photoelectric conversion, a first exposure time determination unit that determines a first exposure time based on a basis of the image generated by the imaging element, a horizontal scanning period determination unit that determines a horizontal scanning period based on a basis of the first exposure time, and a second exposure time determination unit that determines a second exposure time which is an integer multiple of the horizontal scanning period, wherein the image is generated by an electronic shutter of the second exposure time.

According to other aspects of the present disclosure, one or more additional imaging apparatuses, one or more control or driving methods, and one or more storage mediums. Further features of the present disclosure will become apparent from the following description of exemplary embodiments with reference to the attached drawings.

BRIEF DESCRIPTION OF THE DRAWINGS

FIG. 5 is a flowchart illustrating a driving method for the imaging apparatus according to a second exemplary embodiment.

DESCRIPTION OF THE EMBODIMENTS

Figure 1:
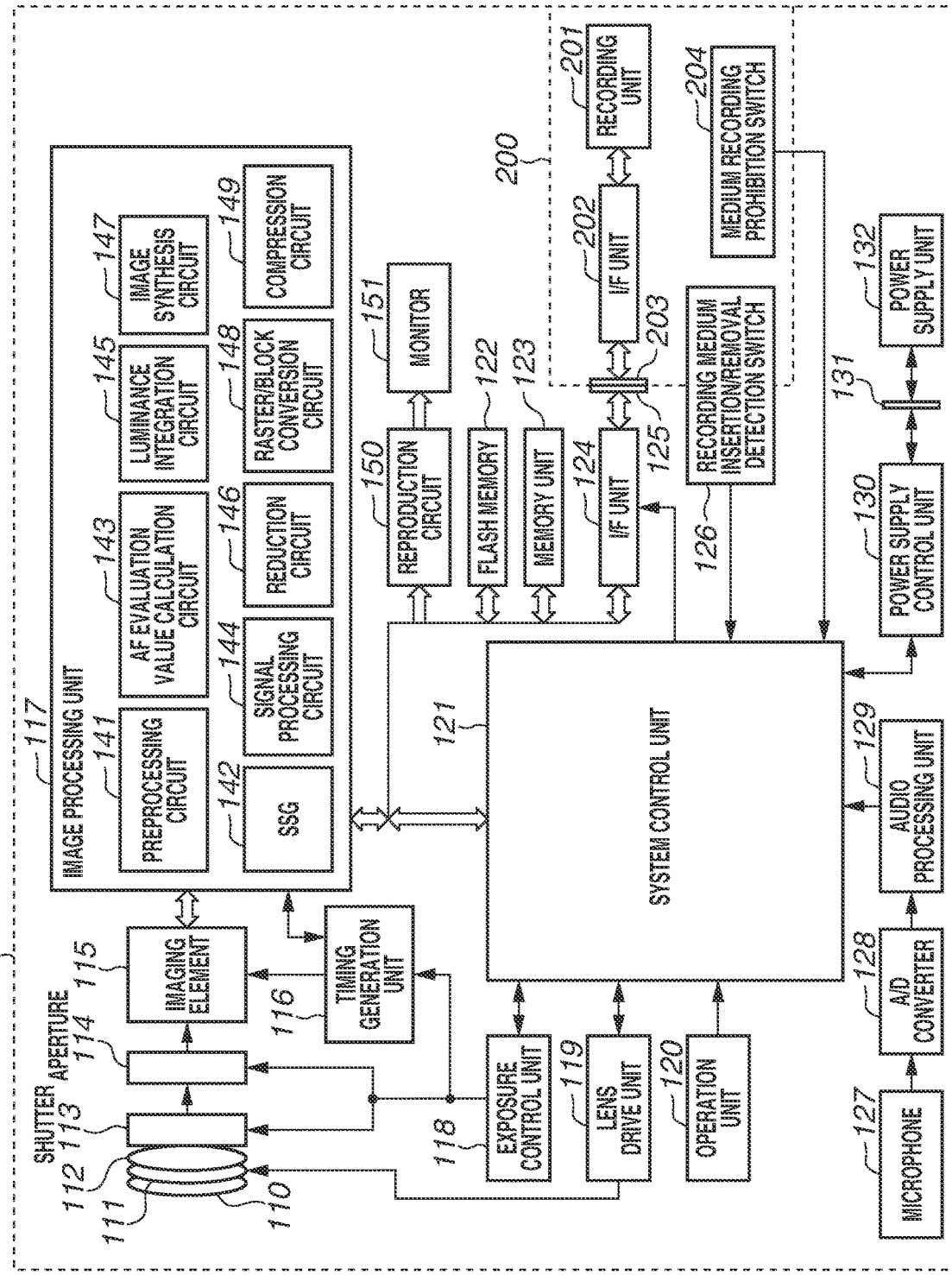
FIG. 1 is a diagram illustrating a configuration example of an imaging apparatus.

FIG. 1 is a block diagram illustrating a configuration example of an imaging apparatus 100 according to a first exemplary embodiment of the present disclosure. The imaging apparatus 100 can be adapted to digital cameras and video cameras as well as smartphones, tablets, industrial cameras, and medical cameras.

The imaging apparatus 100 includes a zoom lens 110, a shift lens 111 that corrects a camera shake, a focus lens 112 for focus adjustment, a mechanical shutter 113 that blocks light flux from being sent to a later stage, and an aperture 114 that adjusts the light flux to be sent to the later stage. Further, the imaging apparatus 100 includes an imaging element 115, and a timing generation unit 116 that generates a timing pulse necessary for driving the imaging element 115 and sampling. The imaging element 115 generates an analog image signal through photoelectric conversion, and converts the analog image signal into digital image data to output the digital image data to an image processing unit 117.

The image processing unit 117 includes a preprocessing circuit 141, a synchronous signal generator (SSG) circuit 142, an autofocus (AF) evaluation value calculation circuit 143, a signal processing circuit 144, a luminance integration circuit 145, a reduction circuit 146, an image synthesis circuit 147, a raster/block conversion circuit 148, and a compression circuit 149. The SSG circuit 142 receives an image capture driving clock from the timing generation unit 116, and generates horizontal and vertical synchronous signals to output the horizontal and vertical synchronous signals to the timing generation unit 116 and the imaging element 115. The preprocessing circuit 141 distributes an input image line by line to the luminance integration circuit 145 and the signal processing circuit 144. Further, the preprocessing circuit 141 performs, for example, data correction processing between channels necessary for the image data of the imaging element 115. The AF evaluation value calculation circuit 143 performs filter processing in a horizontal direction on luminance components of the image data input into a plurality of set evaluation regions, and while extracting a predetermined frequency representing a contrast, selects a maximum value to perform an integration operation in a vertical direction. The luminance integration circuit 145 generates a luminance component from an RGB signal through mixing, and divides the input image into a plurality of regions to generate luminance components for respective regions. The signal processing circuit 144 performs color carrier removal processing, aperture correction processing, and gamma correction processing on the image data of the imaging element 115 to generate a luminance signal. At the same time, the signal processing circuit 144 executes, for example, color interpolation, matrix conversion, gamma processing, and gain adjustment to generate a color difference signal, and writes image data of a YUV format in a memory unit 123. According to each level, the signal processing circuit 144 aggregates a luminance signal (Y) of the YUV format image data to be generated, and generates luminance distribution data according to each image data.

The image synthesis circuit 147 receives a plurality of image data of a red, green, blue (RGB) format stored in the memory unit 123 or a plurality of image data of the YUV format obtained by signal processing performed on the image data of the RGB format. The image synthesis circuit 147 multiplies the image data by a coefficient set for each pixel and adds the multiplied image data to generate a combined image. The reduction circuit 146 receives the image data output from the signal processing circuit 144, and performs processing, such as cut-out processing, thinning processing, and linear interpolation processing, on input pixel data to make the pixel data be subject to reduction processing in horizontal and vertical directions. The raster/block conversion circuit 148 converts raster/scan image data resized by the reduction circuit 146 into block/scan image data. Such a series of the image processing is realized by using the memory unit 123 as a buffer memory. The compression circuit 149 compresses the YUV image data converted into the block/scan data by the buffer memory in accordance with a still image or moving image compression method, and outputs a still image file or a moving image bit stream.

The exposure control unit 118 controls the mechanical shutter 113, the aperture 114, and an electronic shutter of the timing generation unit 116. The lens drive unit 119 moves the zoom lens 110 and the focus lens 112 along an optical axis, and focuses a subject image on the imaging element 115. Further, the lens drive unit 119 drives the shift lens 111 in accordance with outputs from an angular velocity sensor and an acceleration sensor, and optically corrects a camera shake of the imaging apparatus (image recording/reproducing apparatus) 100. Further, an operation unit 120 includes a release switch for instructing image capturing, a moving image switch for starting moving image recording, and operation instruction switches for performing various settings.

A system control unit 121 includes a central processing unit (CPU) and its interface circuit, a direct memory access controller (DMAC), and a bus arbiter. A program to be executed by the CPU of the system control unit 121 is stored in a flash memory 122. Further, the memory unit 123, which is, for example, a dynamic random access memory (DRAM), temporarily saves data being processed. The program in the flash memory 122 is developed and used by the memory unit 123.

An interface unit 124 is disposed between the system control unit 121 and a recording medium 200. A connector 125 is for connecting a main body of the imaging apparatus 100 to the recording medium 200. A recording medium insertion/removal detection switch 126 detects insertion/removal of the recording medium 200.

A microphone 127 converts an input audio into an audio signal. An A/D converter 128 converts an analog audio output from the microphone 127 into digital audio data. An audio processing unit 129 performs predetermined audio processing on the digital audio data, and outputs an audio bit stream.

A power supply control unit 130 controls a battery detection circuit and a direct-current/direct-current (DC/DC) converter to supply necessary voltages to each of the units including the recording medium 200 during a necessary time period. A power supply connector 131 connects a power supply unit 132 to the power supply control unit 130. The power supply unit 132 is a primary battery, a secondary battery, or an alternating current (AC) adaptor. The above control is made by the system control unit 121.

A reproduction circuit 150 converts image data that is generated by the image processing unit 117 and is stored in the memory unit 123 into a display image, and transmits the display image to a monitor 151. The monitor 151 is a display device that displays the display image. The reproduction circuit 150 separates the YUV format image data into a luminance component signal Y and a modulation color difference component C, and performs low-pass filter (LPF) processing on a signal Y that is converted into an analog signal through digital/analog (D/A) conversion. Further, the reproduction circuit 150 performs band pass filter (BPF) processing on the analog modulation color difference component C that has been obtained by D/A conversion, and extracts only a frequency component of the modulation color difference component C. The reproduction circuit 150 then generates the signal Y and a red/green/blue (RGB) signal through conversion based on the thus generated signal component and a subcarrier frequency, and outputs them to the monitor 151. In such a manner, the image data from the imaging element 115 is consecutively processed to be displayed, and thus an electronic view finder (EVF) is realized.

The recording medium 200 includes a recording unit 201 configured with a semiconductor memory, an interface (I/F) 202 for connection with the imaging apparatus 100, a connector 203 that makes a connection with the imaging apparatus 100, and a medium recording prohibition switch 204.

Figure 7A:
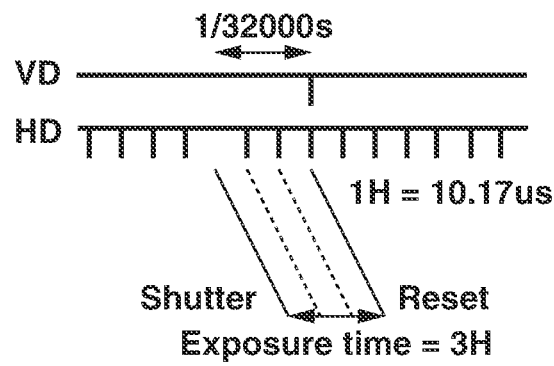
FIGS. 7A to 7C are diagrams illustrating adjustment of an exposure time in a length of a horizontal scanning period.
Figure 7B:
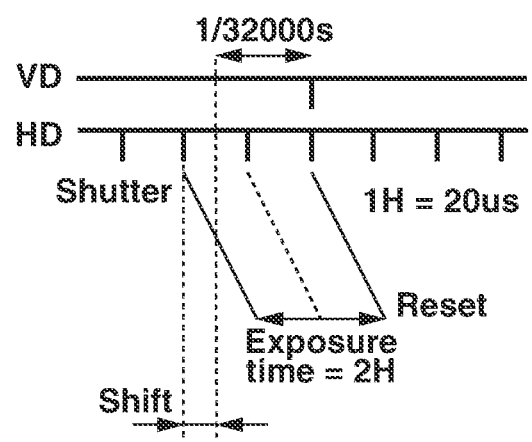
Figure 7C:
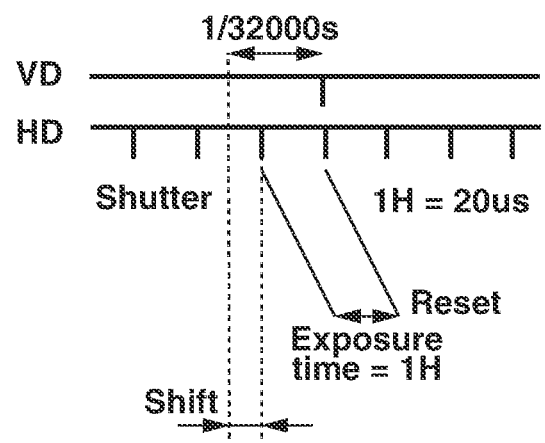

FIGS. 7A to 7C are diagrams illustrating adjustment of an exposure time of the imaging element 115 in a length of a horizontal scanning period, and illustrating a vertical synchronous signal VD and a horizontal synchronous signal HD. In most cases, a CMOS sensor of the imaging element 115 has a limitation that a control signal timing of the electronic shutter is adjustable only in the length of the horizontal scanning period. In such a case, an issue of how to realize a high-speed shutter arises. As an example, a case where a shutter speed 1/32000 s (≈30.518 μs) is realized will be described. As illustrated in FIG. 7A, when the horizontal scanning period (hereinafter, H) is 1H which is equal to 10.17 μs, the shutter speed can be executed with the exposure time of approximately 3H. On the other hand, as illustrated in FIGS. 7B and 7C, when 1H=20 μs, a suitable exposure time cannot be realized based on an integer multiple of the horizontal scanning period. As illustrated in FIG. 7B, when the exposure time is 2H, the exposure time becomes too long. As illustrated in FIG. 7C, when the exposure time is 1H, the exposure time is insufficient. An exemplary embodiment in which a high-speed shutter is realized by timing control of the imaging element 115 will be described below.

Figure 2A:
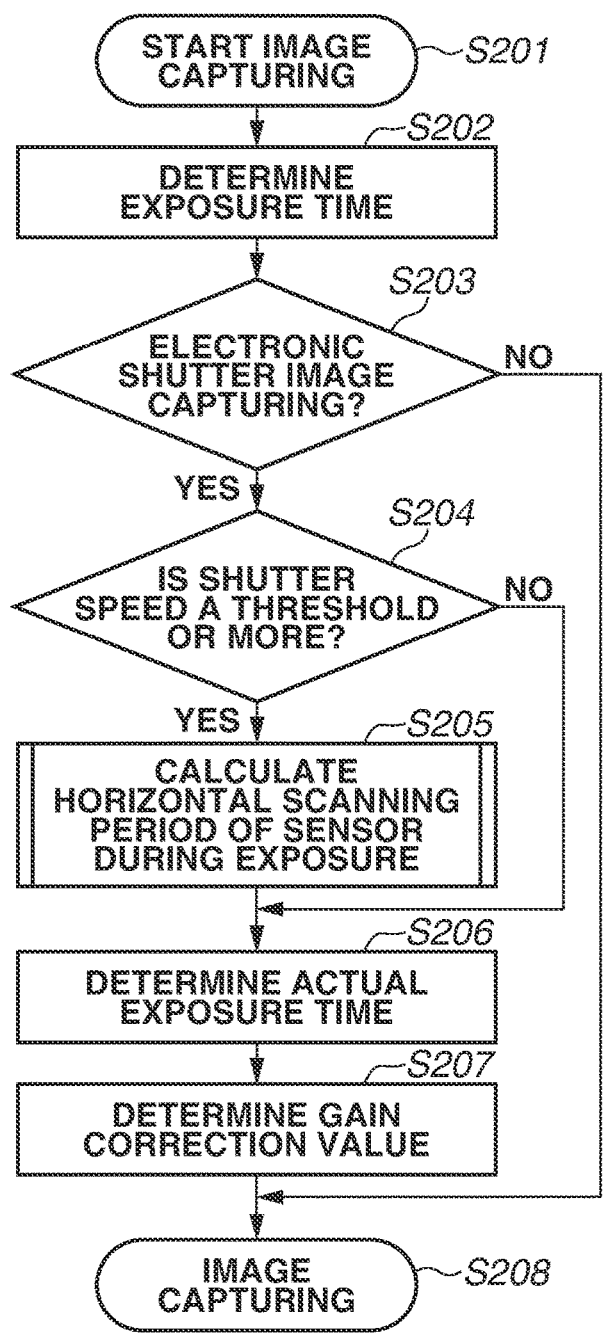
FIGS. 2A and 2B are flowcharts illustrating a driving method for the imaging apparatus according to a first exemplary embodiment.

FIG. 2A is a flowchart illustrating a driving method for the imaging apparatus 100 according to the first exemplary embodiment. A case of a still image capturing will be described below. In a case where a still image is captured, a user can select, as a shutter unit, one of the mechanical shutter 113 and an electronic shutter of the imaging element 115 (shutter mode). This selection is set by the user through the monitor 151 and the operation unit 120. In a case of the electronic shutter, the timing generation unit 116 controls the electronic shutter of the imaging element 115.

In step S201, the imaging apparatus 100 starts the following image capture processing when the release switch of the operation unit 120 is pressed. In step S202, the image processing unit 117 and the system control unit 121, which configure a first exposure time determination unit, determine an exposure time (first exposure time) at an image capturing based on the image data generated by the imaging element 115 when the image capturing is instructed. The system control unit 121 notifies the exposure control unit 118 of the exposure time. In step S203, the system control unit 121 determines whether the shutter mode at the image capturing is the mechanical shutter 113 or the electronic shutter of the imaging element 115. In a case where the shutter mode at the image capturing is the mechanical shutter 113 (NO in step S203), the processing proceeds to step S208. In step S208, the system control unit 121 causes the mechanical shutter 113 to capture an image. In a case where the shutter mode at the image capturing time is the electronic shutter of the imaging element 115 (YES in step S203), the processing proceeds to step S204.

In step S204, the system control unit 121 determines, based on the exposure time determined in step S202, whether a shutter speed of the electronic shutter is a threshold or more. In a case where the shutter speed is the threshold or more (YES in step S204), the processing proceeds to step S205. In a case where the shutter speed is less than the threshold (NO in step S204), the processing proceeds to step S206. That is, when the exposure time in step S202 is a second threshold or less (YES in step S204), the processing proceeds to step S205, and if the exposure time in step S202 is longer than the second threshold (NO in step S204), the system control unit 121 selects a standard horizontal scanning period, and the processing proceeds to step S206. In step S205, the system control unit (horizontal scanning period determination unit) 121 determines a horizontal scanning period of the imaging element 115 at the exposure based on the exposure time in step S202, and the processing proceeds to step S206. The timing generation unit 116 generates a horizontal synchronous signal HD based on the horizontal scanning period. This will be described in detail below. In step S204, in a case where the shutter speed is less than the threshold (NO in step S204), the system control unit 121 selects the standard horizontal scanning period, and the processing proceeds to step S206.

In step S206, the system control unit (second exposure time determination unit) 121 determines an actual exposure time (second exposure time) that is an integer multiple of the determined horizontal scanning period. In step S207, the system control unit 121 determines a gain correction value for correcting a difference between the actual exposure time determined in step S206 and the exposure time determined in step S202. Obviously, it is preferable that the exposure time determined in step S202 and the actual exposure time determined in step S206 are closer to each other and that the gain correction value determined in step S206 is closer to 0.

In step S208, the imaging element 115 generates image data through an electronic shutter of the actual exposure time determined in step S206. The image processing unit 117, which is a gain correction unit, performs gain correction on the image data generated by the imaging element 115, based on the gain correction value determined in step S207.

Figure 3:
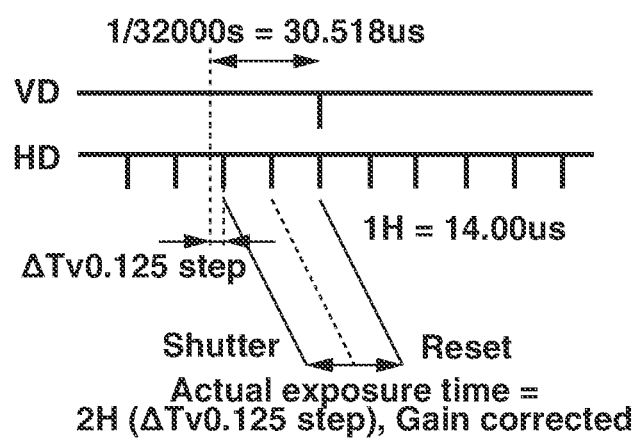
FIG. 3 is a diagram for describing exposure time determination processing and gain correction value determination processing.

FIG. 3 is a diagram for describing processing in step S206 and step S207 in FIG. 2A. For example, in step S202, the system control unit 121 determines the exposure time to be $1/32000$ s ($\approx 30.518$ μs). In step S205, the system control unit 121 determines the horizontal scanning period (1H) of 14 μs. In step S206, the system control unit 121 determine the actual exposure time that is twice as long as the horizontal scanning period, namely, 2H which is equal to 28 μs. In step S207, the system control unit 121 calculates a difference ΔTv (=0.125 step) between the actual exposure time 2H, which is equal to 28 μs, determined in step S206 and the exposure time $1/32000$ s ($\approx 30.518$ μs) determined in step S202. The system control unit 121 then determines a gain correction value for correcting the difference ΔTv (=0.125 step). The image processing unit 117 performs gain correction on the image output from the imaging element 115 by using a gain to which the gain correction value is added, to realize suitable exposure.

Figure 2B:
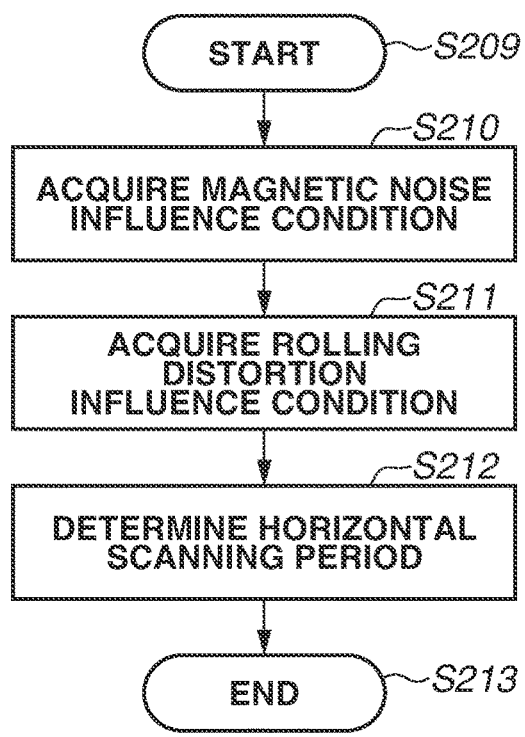

FIG. 2B is a flowchart illustrating details of horizontal scanning period calculation processing, in step S205 in FIG. 2A, to be executed by the imaging element 115 at the exposure. In step S209, the system control unit 121 starts the horizontal scanning period calculation processing. In step S210, the system control unit 121 acquires a condition about whether the imaging element 115 is influenced by a magnetic noise. When a motor of the shift lens 111 or the focus lens 112 for focus adjustment is energized, the imaging element 115 is influenced by a magnetic noise. Further, the imaging element 115 is influenced by a magnetic noise depending on positions of the respective motors determined in accordance with a position of the zoom lens 110. The system control unit 121 acquires conditions for receiving an influence of the magnetic noise. If the imaging element 115 is easily influenced by the magnetic noise, the system control unit 121 should determine the horizontal scanning period of the imaging element 115 to a value such that an interference due to the influence of the magnetic noise is not noticeable.

In step S211, the system control unit 121 acquires a condition about whether the imaging element 115 is influenced by a rolling distortion. For example, as the position of the zoom lens 110 is closer to a telephoto end, a distortion of a subject is more noticeable. Further, when a subject is a moving member, the subject is easily influenced by the rolling distortion. If the condition is such that the imaging element 115 is easily influenced by the rolling distortion, the system control unit 121 should take into account of these conditions, the system control unit 121 and set the horizontal scanning period of the imaging element 115 to a value such that the rolling distortion is not noticeable (short period).

In step S212, the system control unit 121 determines the horizontal scanning period of the imaging element 115 based on the conditions in steps S210 and S211. Thereafter, in step S213, the system control unit 121 ends the horizontal scanning period calculation processing.

Figure 4A:
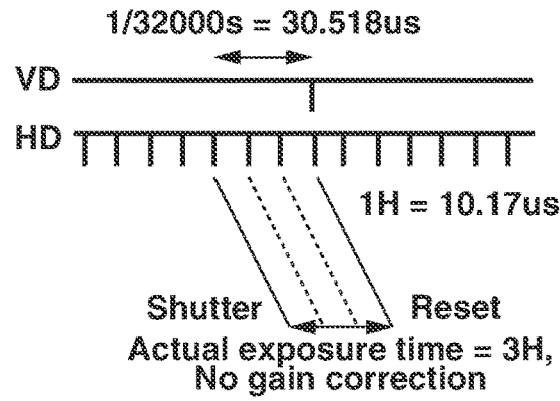
FIGS. 4A to 4C are diagrams for describing influences of a magnetic noise and a rolling distortion.
Figure 4B:
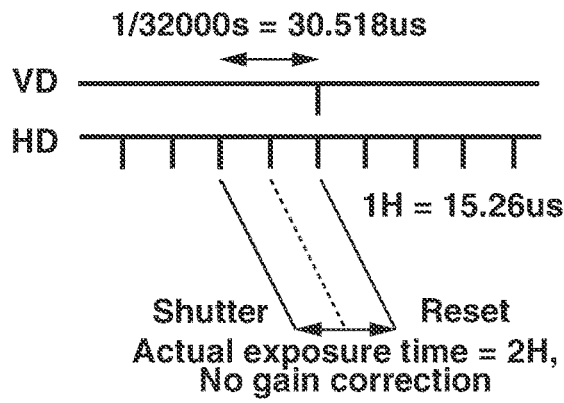
Figure 4C:
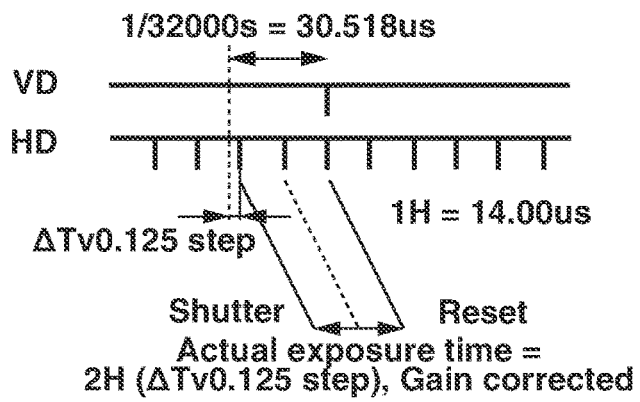

FIGS. 4A to 4C are diagrams for describing specific examples of the processing in FIGS. 2A and 2B. It is assumed that a smallest value of the horizontal scanning period (1H) of the imaging element 115 is 10 μs. Further, it is assumed that a value of the horizontal scanning period is such that 10≤the horizontal scanning period <14 μs when the interference is caused due to the magnetic noise that affects the imaging element 115.

FIG. 4A illustrates a case where determination that the influence of the magnetic noises does not exert is made in step S210. When the determination is made that the influence of the magnetic noise does not exist, in step S206, the system control unit 121 should reduce the actual exposure time as short as possible. When the exposure time determined in step S202 is 1/32000 s (≈30.518 μs), the system control unit 121 adjusts the horizontal scanning period (1H) so that the exposure time reaches an integer multiple of a shortest horizontal scanning period as close as possible, and calculates the horizontal scanning period 1H which is equal to 10.17 μs. When 1H=10.17 μs, the exposure time 1/32000 s (≈30.518 μs) can be realized by 3H (3×10.17 μs=30.51 μs). In this case, in step S206, the system control unit 121 determines the actual exposure time 3H (=30.51 μs). Since the actual exposure time 3H (=30.51 μs) determined in step S206 approximately matches with the exposure time 1/32000 s (≈30.518 μs) determined in step S202, the gain correction in step S207 is not required.

FIG. 4B illustrates a case where determination that the influence of the magnetic noise exists and the influence of the rolling distortion does not exist is made in steps S210 and S211. If the determination is made that the influence of the magnetic noise exists, setting of a horizontal scanning period such that the interference of the magnetic noise is caused should be avoided. A case where the exposure time determined in step S202 is 1/32000 s (≈30.518 μs) will be described. The system control unit 121 avoids the setting of the horizontal scanning period such that the interference of the magnetic noise is caused, and adjusts the horizontal scanning period so that the exposure time reaches the integer multiple of the shortest horizontal scanning period as close as possible to calculate the horizontal scanning period 1H which is equal to 15.26 μs. When 1H=15.26 μs, the exposure time 1/32000 s (≈30.518 μs) can be realized by 2H (2×15.26 μs=30.52 μs). In this case, in step S206, the system control unit 121 determines the actual exposure time 2H (=30.52 μs). Since the actual exposure time 2H (=30.52 μs) determined in step S206 approximately matches with the exposure time 1/32000 s (≈30.518 μs) determined in step S202, the gain correction in step S207 is not required.

FIG. 4C illustrates a case where determination that the influence of the magnetic noise and the influence of the rolling distortion exist is made in steps S210 and S211. If the determination is made that the influence of the magnetic noise exists, setting of a horizontal scanning period such that the interference of the magnetic noise is caused should be avoided. Further, since the influence of the rolling distortion exists, it is preferable that the value of the horizontal scanning period is as small as possible. A case where the exposure time determined in step S202 is 1/32000 s (≈30.518 μs) will be described. The system control unit 121 avoids setting of the horizontal scanning period such that the interference of the magnetic noise is caused, and sets the shortest horizontal scanning period, and makes adjustment so that the integer multiple of the horizontal scanning period reaches the exposure time determined in step S202 to a certain extent. In this case, in step S205, the system control unit 121 calculates the horizontal scanning period 1H which is equal to 14 μs. In step S206, the system control unit 121 determines the actual exposure time 2H (2×14 μs=28 μs). A difference between the exposure time 1/32000 s (≈30.518 μs) and the actual exposure time 2H (=28 μs) corresponds to an exposure step difference ΔTv of 0.125 step. For example, when a shift up to ΔTv of 0.5 step is permitted, this exposure time lag can be permitted. In step S205, the system control unit 121 determines the horizontal scanning period 1H=14 μs so that a difference between the integer multiple of the horizontal scanning period and the exposure time in step S202 becomes a first threshold or less. In step S207, the system control unit 121 determines a gain correction value based on the difference between the exposure time 1/32000 s (≈30.518 μs) and the actual exposure time 2H (=28 μs). The image processing unit 117 performs gain correction for 0.125 step based on the gain correction value to correct the exposure time difference, and thus, a suitable exposure time and a high-speed electronic shutter can be realized.

As described above, according to the first exemplary embodiment of the present disclosure, high-speed electronic shutter image capturing with a suitable exposure time can be executed by controlling drive timing of the imaging element 115 without an additional special mechanism to the imaging apparatus 100.

According to the first exemplary embodiment of the present disclosure, in a case where the shutter speed is a threshold or more, namely, in a case where a certain high speed shutter is executed, the processing in step S205 is performed. Alternatively, only at a certain shutter speed (exposure time), the processing in step S205 may be performed. Further, in FIG. 2B, the magnetic noise and the rolling distortion are exemplified as the condition for changing the horizontal scanning period, but the condition can be changed in accordance with various image capturing conditions. Examples of the image capturing condition include whether image capturing is flash image capturing, a camera image capturing mode, and a camera posture difference.

FIG. 5 is a flowchart illustrating a driving method for the imaging apparatus 100 according to a second exemplary embodiment of the present disclosure. The points of difference between the second exemplary embodiment and the first exemplary embodiment will be described below. In the second exemplary embodiment, the imaging apparatus 100 captures a moving image, and the electronic shutter is always used.

In step S501, the imaging apparatus 100 starts moving image capturing processing when the moving image switch of the operation unit 120 is pressed. In step S502, the image processing unit 117 and the system control unit 121 acquire a next target exposure time during moving image capturing, based on image data output from the imaging element 115. In step S503, the system control unit 121 acquires current horizontal scanning period and exposure time. In step S504, similarly to steps S205 to S207 in FIG. 2A, the system control unit 121 determines a horizontal scanning period, an exposure time, and a gain correction value that are to be set next. The gain correction value is based on a difference between the target exposure time in step S502 and the actual exposure time in step S504.

Figure 6:
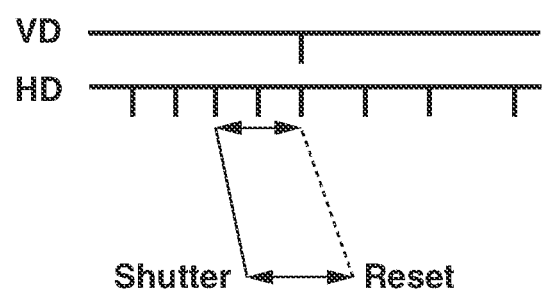
FIG. 6 is a diagram illustrating shutter timing and reset timing.

As illustrated in FIG. 6, when the value of the horizontal scanning period is varied between moving image frames, a shutter timing and a reset timing are changed, and thus the exposure time is different between an upper screen portion and a lower screen portion. For this reason, in step S504, the system control unit 121 changes the value of the horizontal scanning period only within an allowable range when the horizontal scanning period is changed between moving image frames.

In step S505, the system control unit 121 determines whether moving image capturing is ended. In a case where the moving image capturing does not end (NO in step S505), the processing returns to step S502. In a case where the moving image capturing ends (YES in step S505), the processing proceeds to step S506, and the system control unit 121 ends the image capturing processing.

The second exemplary embodiment is an exemplary embodiment of the moving image capturing, but is applicable to live display and the like that serves as a camera finder. The changeable value of the horizontal scanning period can be changed in accordance with moving image capturing or still image capturing. The system control unit 121 determines different horizontal scanning periods between the still image capturing and the moving image capturing.

As described above, according to the first and second exemplary embodiments of the present disclosure, the high speed electronic shutter image capturing with a suitable exposure time can be performed. In the first and second exemplary embodiments of the present disclosure, the case of the digital camera has been described as an example, but the present invention is not limited to the example. That is, the present disclosure may be applied to any device equipped with the imaging element. That is, the present invention is applicable to any devices that can capture images, such as mobile phone terminals, mobile image viewers, televisions equipped with cameras, digital photo frames, music players, game machines, and electronic book readers.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-200882, filed Oct. 12, 2016, which is hereby incorporated by reference herein in its entirety.

What is claimed is:

1. An imaging apparatus comprising:
    an imaging element;
    a controller that determines a horizontal scanning period of the imaging element on a basis of a predetermined first exposure time,
    and a second exposure time which is an integer multiple of the horizontal scanning period and shorter than the first exposure time; and
    a drive circuit that drives the imaging element to perform electronic shutter image capturing in the second exposure time,
    wherein the controller determines the horizontal scanning period so that a difference between the integer multiple of the horizontal scanning period and the first exposure time is a predetermined time or less.

2. The imaging apparatus according to claim 1, further comprising a processor that performs gain correction on the image generated by the imaging element in accordance with a difference between the first exposure time and the second exposure time.

3. The imaging apparatus according to claim 1, wherein in a case where the first exposure time is equal to or less than a predetermined threshold, the controller determines the horizontal scanning period on the basis of the first exposure time, and in a case where the first exposure time is more than the predetermined threshold, the controller selects a standard horizontal scanning period.

4. The imaging apparatus according to claim 1, wherein in a case where the first exposure time is a specific exposure time, the controller determines the horizontal scanning period on the basis of the first exposure time, and in a case where the first exposure time is not the specific exposure time, the controller selects a standard horizontal scanning period.

5. The imaging apparatus according to claim 1, wherein the controller determines the horizontal scanning period on a basis of a condition of a magnetic noise and the first exposure time.

6. The imaging apparatus according to claim 1, wherein the controller determines the horizontal scanning period on a basis of a condition of a rolling distortion and the first exposure time.

7. The imaging apparatus according to claim 1, wherein the controller determines the horizontal scanning period on a basis of an image capturing condition and the first exposure time.

8. The imaging apparatus according to claim 1, wherein in a case where a still image is captured using the electronic shutter of the imaging element, the controller determines the horizontal scanning period on the basis of the first exposure time, and determines the second exposure time which is the integer multiple of the horizontal scanning period.

9. The imaging apparatus according to claim 1, wherein in a case where a moving image is captured, the controller determines the horizontal scanning period on the basis of the first exposure time, and determines the second exposure time which is the integer multiple of the horizontal scanning period.

10. The imaging apparatus according to claim 1, wherein in a case where the horizontal scanning period is changed between moving image frames, the controller changes the horizontal scanning period within an allowable range.

11. The imaging apparatus according to claim 1, wherein the controller determines horizontal scanning periods different between still image capturing and moving image capturing.

12. A driving method for an imaging apparatus having an imaging element, the driving method comprising:

causing a controller to determine a horizontal scanning period of the imaging element based on a predetermined first exposure time;
causing the controller to determine a second exposure time which is an integer multiple of the horizontal scanning period and shorter than the first exposure time; and
causing a drive circuit to drive the imaging element to perform electronic shutter image capturing in the second exposure time,
wherein the controller determines the horizontal scanning period so that a difference between the integer multiple of the horizontal scanning period and the first exposure time is a predetermined time or less.

* * * * *